(12) United States Patent
Yoon (10) Patent No.: US 7,914,290 B2
(45) Date of Patent: Mar. 29, 2011

(54) CLOTHES FOR INFANT EDUCATION

(76) Inventor: Mok Yoon, Seongnam-si (KR)

( * ) Notice: Subject to any disclaimer, the term of this patent is extended or adjusted under 35 U.S.C. 154(b) by 609 days.

(21) Appl. No.: 11/935,102

(22) Filed: Nov. 5, 2007

(65) Prior Publication Data

US 2009/0117531 A1    May 7, 2009

(51) Int. Cl.
*G09B 1/00*    (2006.01)
(52) U.S. Cl. ........................................... 434/260
(58) Field of Classification Search ................ 434/256, 434/258, 260, 236; 2/48, 69, 75
See application file for complete search history.

(56) References Cited

U.S. PATENT DOCUMENTS

| | | | |
|---|---|---|---|
| 2,972,820 A * | 2/1961 | Cano | 434/260 |
| 3,624,686 A * | 11/1971 | Beals | 434/98 |
| 3,638,334 A * | 2/1972 | Malikowski | 434/260 |
| 3,724,101 A * | 4/1973 | Slezak | 434/170 |
| 3,997,982 A * | 12/1976 | Holland | 434/260 |
| 4,249,268 A * | 2/1981 | Berler | 2/115 |
| 4,519,781 A * | 5/1985 | Boyd | 434/156 |
| 4,661,072 A * | 4/1987 | White | 434/260 |
| 4,710,979 A * | 12/1987 | Bull et al. | 2/48 |
| 4,723,323 A * | 2/1988 | Wright, Jr. | 2/48 |
| D317,375 S * | 6/1991 | Severinsen | D2/725 |
| 5,468,152 A * | 11/1995 | Lenart | 434/429 |
| 5,943,697 A * | 8/1999 | Poskanzer | 2/69 |
| 5,957,692 A * | 9/1999 | McCracken et al. | 434/159 |
| 6,151,715 A * | 11/2000 | Doherty | 2/48 |
| 6,755,660 B1 * | 6/2004 | Weeks | 434/260 |
| 7,296,999 B2 * | 11/2007 | Webber | 434/168 |
| 7,640,599 B2 * | 1/2010 | Amsel | 2/49.1 |
| 2002/0108162 A1 * | 8/2002 | Bolds-Leftridge | 2/49.1 |

* cited by examiner

*Primary Examiner* — Kurt Fernstrom
(74) *Attorney, Agent, or Firm* — Jefferson IP Law, LLP (57) ABSTRACT

As for clothes for infant according to the present invention, it consists of and is characterized as followings: the base part embodied to be able to be detachably attached on surface of clothes; the educational auxiliary member detachably attached on the above base part but having a shape among as a plane or a solid body including a educational contents which consists of any of character, picture, digit, and shape and contains education content for infant and; a coupling auxiliary member which consists of any of a button, a velcro tape, a zipper, a magnet, a hook, and combination of a projected rod and a coupling groove and also, provides coupling ability of attachment and detachment on any of the above clothes and the above base part, or any of the above base part and the above educational auxiliary member.
Through clothes for infant education according to the present invention, an environment, which infant can take education feeling sight and body heat of educators such as parents, etc, is provided. Thereupon, infant can gain emotional settlement and there are merits that educators can smoothly and naturally teach infant on combination and relation between various objects by providing the base part having shape or content having relation with educational contents like shape or content contained in educational auxiliary member as well.

11 Claims, 10 Drawing Sheets

Front Part  Rear Part

Fig. 6b

Front Part  Rear Part

CLOTHES FOR INFANT EDUCATION

TECHNICAL FIELD

The present invention is related to clothing for an infant's education. The clothing is furnished with an educational auxiliary member by means of a base part. More particularly, the invention relates to clothes for an infant's education configured to provide the infant a sense of intimacy with a person in charge of the infant's education, as well as to provide educational effects of face-to-face education between the infant and a person in charge of the infant's education, through a procedure in which the infant directly touches and sees both an educational auxiliary member and the base part to form the educational auxiliary member having various educational contents, on clothes of parents, grandparents, teachers, etc., to make development of the infant's intelligence and senses possible.

BACKGROUND ART

"Infant" means a newborn person from birth to about 36 months of age, including a baby, crawler, toddler, etc. During these periods and according to growth of each period, physical movement development, emotional development, linguistic development, the advancement of human knowledge, etc., will be achieved and also, parents provide their child with various educational material for smooth and efficient development of each such field.

Referring to traditional theory as known so far, through the senses such as sight, touch, hearing, smell, etc., an infant's intelligence development is possible. He shows more sensible interest on materials having color and shape among educational materials, and he shows different improvement speed according to a quantity and quality of such educational materials that he receives before age 3. Incidentally, the use of gender pronouns such as "he" or "his" in this application is not exclusive, and is intended to include both male and female infants.

According to a study by Dr. Burton White, he divided infants into two groups to determine whether a baby grows up developing inherently or if instead the baby's growth depends substantially on environment and its surrounding people.

As for the first group of infants in this study, nurses treated infants from 6 to 36 days after birth, wearing nursing clothes devoid of any pattern, and as for the second group, nurses, who wore shirts having colors and patterns, watched the infants face-to-face after nursing.

As a result, infants in the second group showed more active movement than did infants in the first group, and showed two months faster trial to stretch out their hands to grab an object.

Thanks to such infant learning theory, currently, many parents have already realized it and have provided their children with learning chances that their child can realize bright and beautiful color (visual learning) by using various kinds of toys, stickers, characters, etc., sound (acoustic learning) by using chimes, etc., and feeling (tactile learning) by touching and rubbing.

DISCLOSURE OF INVENTION

Technical Problem

Presently, as for play studying instruments such as toys for infant, etc., parents first show how to play with the instruments to the infant, arouse the infant's interest, and then, the infant plays with them by himself. Of course, persons in charge of education including parents can play them with infant together, but such education is basically performed in order that eyes of both of parents and infant are focused on the playing instruments. Therefore, generally the infant himself grabs it and the parents watch the infant's playing while beside him and help him to properly play with them.

An infant instinctively tries to find emotional stability through throwing himself into his parents' arms or feeling the parents' body heat. Thereupon, playing instruments separated from the parents have a limit to delivering educational contents in that the infant attempts to directly feel the parents' body heat.

Namely, in babyhood, emotional education is sought such that an infant can feel his parents' existence through feeling his parents' body heat and making eye contact with his parents, which is a problem connected directly with whether the infant could grow up having plentiful sensitivity.

That is to say, perhaps, various existing playing instruments might provide an environment for developing a specific sense, but such playing instruments are not sufficient to providing an environment for building character that the infant can feel the parents' existence and their warm chest, directly making eye contact with the parents.

Referring to U.S. Pat. No. 5,957,692, disclosing a technology to attach playing instrument on clothes, it has been observed that an infant can play with a playing instrument by himself through inversely attaching playing instruments of various methods to the infant's (or child's) clothes. According to such technology, although its uniqueness which is that the infant can play with the playing instrument attached on his clothes by himself was recognized, such a playing instrument is only for having the infant play by himself rather than for playing together with the parents. Therefore, it has a problem that it is difficult to be used for realizing humanity education through the parents.

Consequently, there is a need for developing clothes for pursuing development of studying and humanity education at once by attaching playing instruments on educators' clothes such as parents, teachers, etc., although a playing instrument is attached on clothes to plan development of an infant's intelligence.

Technical Solution

The present invention is proposed to solve the above problems and also, the present invention provides an educational auxiliary member for clothes of educators including parents, etc. However, in order to cultivate spatial perception of the infant and also to provide various environments for intelligence development, as a basic purpose of the present invention, the present invention provides clothes including an educational auxiliary member, which consists of various educational contents, inside a base part designed to be detachably attached on clothes in various methods.

As another object of the present invention, the present invention provides clothing that itself can be used as educational contents by forming the base part itself as shapes such as a blackboard, a window, a clock, an abacus, a frame, a pocket, etc.

As a still further object of the present invention, the present invention provides for the development of an infant's tactile sense by providing the infant with various sensations of touch through applying different roughnesses and textures from clothes' surrounding part in the base part, or applying a separate embossing treatment in the base part.

As yet another further object of the present invention, the present invention has an educational auxiliary member or the base part detachably attached on clothes by using coupling auxiliary members such as a magnet, a VELCRO-type hook-and-pile fastener, a zipper, a hook, a button, a string, etc.

As described above, according to the present invention, clothes for infant education provide various advantageous effects, such as;

1) With the infant able to see and feel the body heat of educators such as parents, etc., the present invention provides an environment in which the infant more readily learns and also, the infant feels emotional stability.

2) By providing a base part having shape and content associated with educational contents such as shape or contents included in the educational auxiliary member, the infant can be advantageously and naturally educated on combination/association relationships of objects.

3) By providing the base part having a different coefficient of friction from surrounding raw material or by including an embossing part, the infant can learn a variety of tactile feeling, which is efficient for developing various senses of touch.

4) By forming a pocket and a string on the base part, the infant is provided with spatial and sensible awareness and at the same time.

5) Through providing a three-dimensional base part such as a frame, a blackboard, a clock, etc., by realizing connection relationships with various educational auxiliary members, the infant has an effect to help him to improve his intelligence.

Other objects and further scope of the applicability of the present invention will become apparent from the detailed description to follow, taken in conjunction with accompanying drawings wherein like parts are designated by like reference numerals.

BEST MODE

As for clothes for infant education according to the present invention, clothes for infant education is characterized in that it comprises:

a base part detachably formed on a surface of clothes;

an educational auxiliary member detachably attached on the base part, wherein the educational auxiliary member can have any shape of a plane or of a solid body including educational contents which consists of any of character, picture, digit, or shape and contains educational content for an infant;

a coupling auxiliary member which may include any of a button, a VELCRO-type hook-and-pile fastener, a zipper, a magnet, a hook, and combination of a projected rod and a coupling groove, and also provides detachable coupling between the clothes and the base part, or between the base part and the educational auxiliary member.

Through clothes for infant education according to the present invention, an environment in which an infant can learn while perceiving the sight and body heat of educators such as parents, etc., is provided. Thereupon, the infant can gain emotional settlement, and there are merits that educators can smoothly and naturally teach the infant on combinations and relationships between various objects by providing the base part having shape or content having relation with educational contents like shape or content contained in an educational auxiliary member as well.

MODE FOR INVENTION

In order to achieve the above objects, as for clothes for infant education according to the present invention, it includes and is characterized as follows: the base part formed to be able to be detachably attached on a surface of clothes; the educational auxiliary member detachably attached on the base part, but having a shape such as a plane or a solid body including educational contents which consists of an object such as a character, picture, digit, or shape, and contains educational content for the infant, and a coupling auxiliary member which can include any of a button, a VELCRO-type hook-and-pile fastener, a zipper, a magnet, a hook, and a combination of a projected rod and a coupling groove, and also provides a coupling ability of attachment and detachment on any of the clothes and the base part, or any of the base part and the educational auxiliary member.

In addition, in clothes for infant education according to the present invention, the base part is characterized in that it can have a different coefficient of friction from a surrounding part of clothes, or being formed as tridimensionality (3D) such as a clock, a blackboard, a string, etc. in more detail.

Together with these, the base part is characterized in that it includes a coupling auxiliary member along around the base part and also, being able to accommodate the educational auxiliary member between the base part and the attachment/detachment cover by additionally preparing an attachment/detachment cover having a window which can be attached and detached on the base part but includes transparency or translucency on a color between specific colors.

Figure 1A:
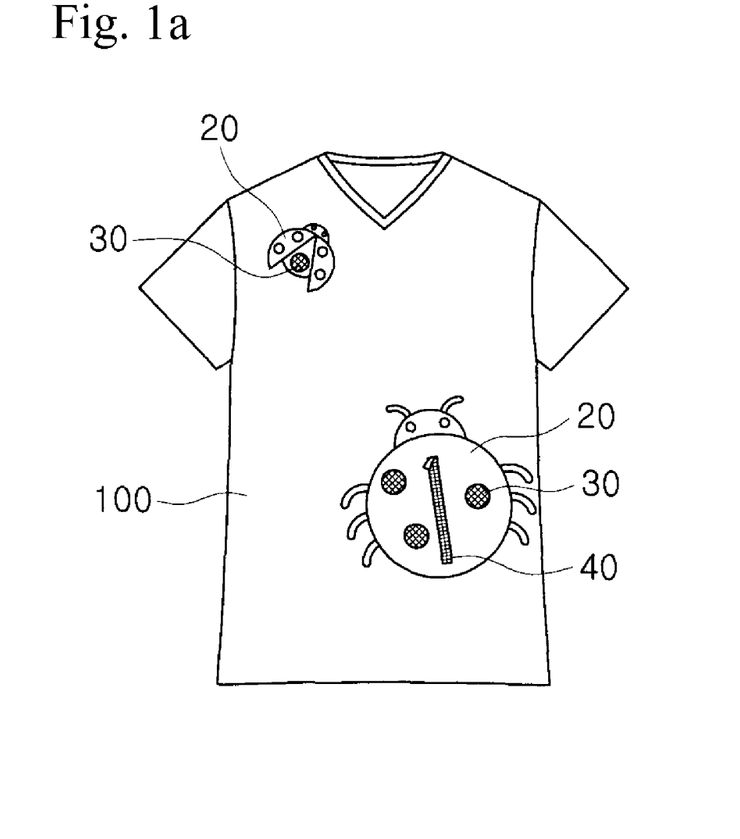
FIG. 1a is a schematic diagram showing a brief embodiment of clothes for infant which the educational auxiliary member is installed on the base part of a ladybug shape.
Figure 1B:
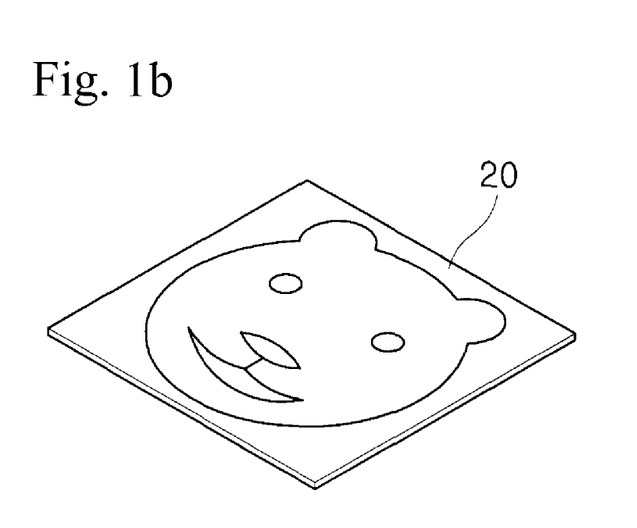
FIG. 1b is a perspective view to illustrate a brief embodiment of an educational auxiliary member according to the present invention.

FIG. 1a is a schematic diagram showing a brief embodiment of clothes for infant education where the educational auxiliary member is installed on the base part of a ladybug shape and FIG. 1b is a perspective view to illustrate a brief embodiment of an educational auxiliary member according to the present invention.

Figure 2:
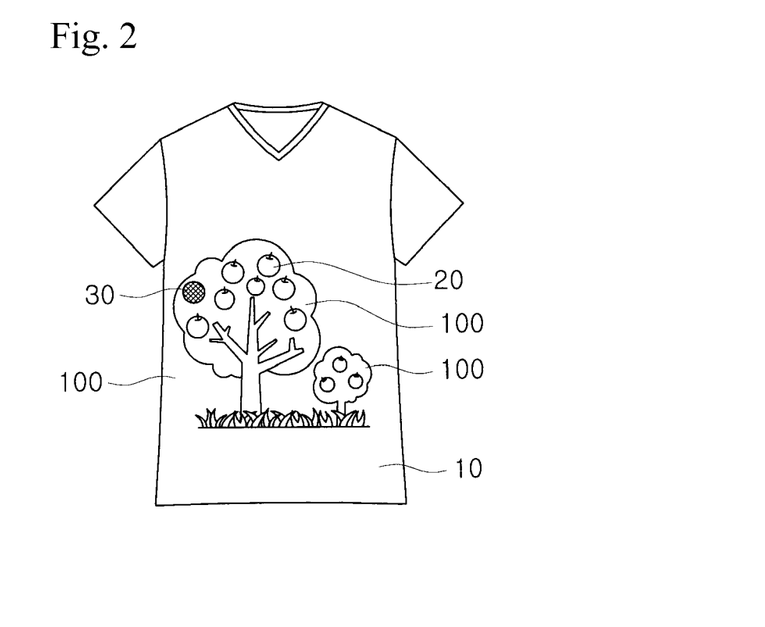
FIG. 2 is a schematic diagram to show a brief embodiment of clothes for an infant on which the educational auxiliary member is installed on the base part of apple tree shape.

FIG. 2 is a schematic diagram showing a brief embodiment of clothes for infant education where the educational auxiliary member (20) is installed on the base part (100) of an apple tree shape.

In the present invention, clothes (10) should be understood as the whole clothes which educators such as parents, grandmother, kindergarten teacher, grandparents, etc., wear and also, clothes in FIG. 1 of the present invention includes clothing not specifically depicted such as pants although the clothes are drawn as a jacket in FIG. 1. Of course, in addition, a range of clothes in FIG. 1 is surely applied for pseudo-clothes such as an apron, a pinafore, etc., that we can generally wear.

As shown in FIG. 1a or FIG. 2, clothes for infant education according to the present invention is formed on the surface of clothes (10) and an educational auxiliary member (20) is devised to be detachably attached on the base part (100) consisting of various shapes having specific organism shapes or characters such as a ladybug, a butterfly, an apple tree, etc., or other specific meaning.

As shown in FIG. 1b, in the present invention, the educational auxiliary member (20) is known as integrated meaning on a card, a cushion, a toy, a mirror, etc., which contain various educational contents such as a picture, a character, a pattern, a letter such as in Korean or English, a sign such as a digit or a calculation symbol, a combination of various colors, a mirror, or a sound making tool such as a chime.

Educational auxiliary member (20) can be formed in a plane-type-like card or a solid-body-like cushion and also, the educational auxiliary member (20) can be produced as a plurality of kinds in order to deliver various visual and tactile concepts to an infant. In addition, when the base part (30) is formed in a solid body type and it secures inside space (such as when the basic part is formed in frame type, which will be explained later), because the auxiliary member can be closely adhesively fixed according to area inside the base part (100) or the auxiliary member can be moved around within a fixed range, it also can provide a characteristic to improve a perception function of movement to the infant.

In the present invention, the base part (100) itself can include the educational auxiliary member (20) or the base part can be detachably attached on a specific part of clothes (10) under the condition that it is equipped with an educational auxiliary member (20) in a separately attaching method. That is to say, the base part (100) can include the educational auxiliary member (20) under the condition that it is separated from the educational auxiliary member (20). But by adding a figure or a shape on the base part, the base part (100) itself can be an educational auxiliary member (20). Also, it is desirable for increasing educational relation that the base part (100) basically has a shape having close connection with educational auxiliary member (20) and educational contents in their meanings.

The base part (100) can have various shapes such as a blackboard, a frame, a watch, a board, etc., according to its functions, which is concretely explained as follows.

Figure 3:
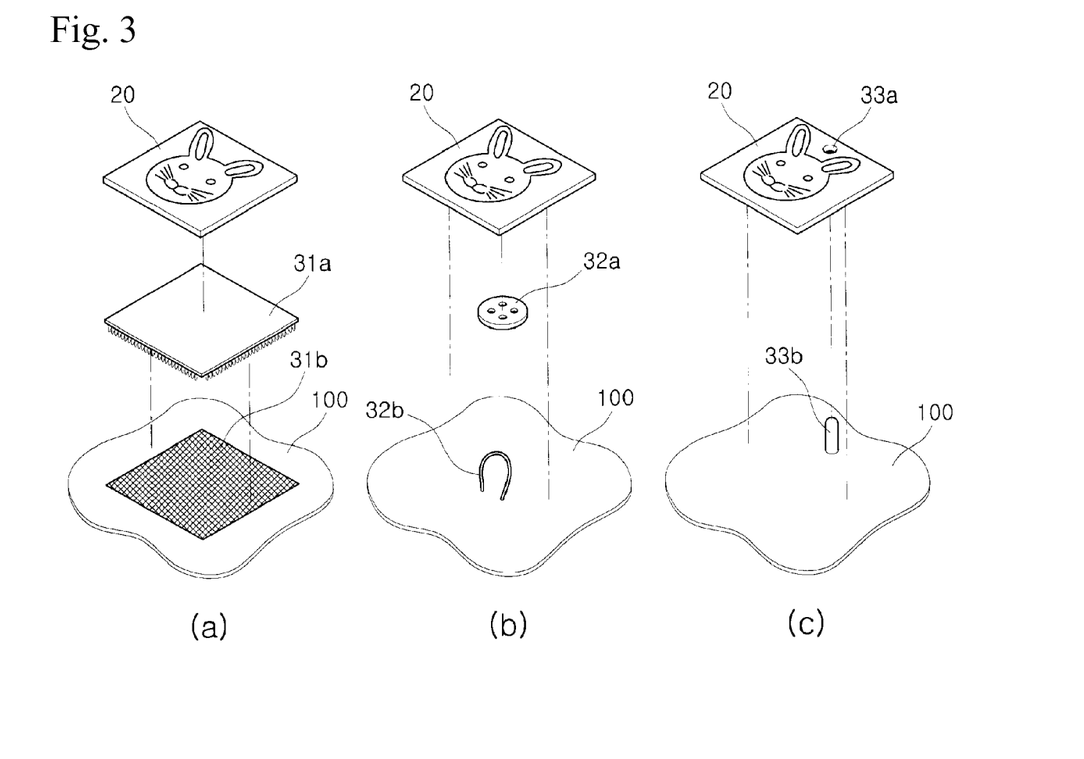
FIG. 3 is a diagram illustrating how the base part is attached on clothes by using a coupling auxiliary member.

FIG. 3 is a diagram illustrating how the base part is attached on clothes by using a coupling auxiliary member.

As shown in FIG. 3, the coupling auxiliary member (30, not generally depicted in FIG. 3) includes of one of various basic coupling methods such as a VELCRO-type hook-and-pile fastener, a combination of button and ring, a zipper, a combination of snap buttons, a hook, a magnet, etc., and it plays role as a functional medium to couple clothes (10) with the base part (100) and also, the base part (100) with the educational auxiliary member (20). Incidentally, these coupling methods are described for exemplary purposes only, and the present invention is not limited to these coupling methods.

Illustratively, FIG. 3(a) schematizes a combination of VELCRO-type hook-and-pile fasteners (31a and 31b), FIG. 3(b) schematizes a combination of a button (32a) and a ring (32b), and also, FIG. 3(c) schematizes a combination of a coupling groove (33a) and a projected rod (33b). Therefore, with regard to how to apply coupling auxiliary members, besides the above methods, the whole coupling methods which are frequently used presently including a magnet, a combination of a female snap and a male snap, a zipper, a hook, etc., can also be used as the coupling auxiliary member (30).

When the coupling auxiliary member (30) is installed between the educational auxiliary member (10) and the base part (100), it can be coupled with the educational auxiliary member (10) or the base part (100) after being attached on the rear side of the educational auxiliary member (10) and the front side of the base part (100) or after it is separately formed. (Of course, it is the same as coupling between the base part and clothes)

Also, the present invention has a position or shape of the coupling auxiliary member (30) given a meaning from a shape expressed in the base part (100). For example, in the case of a ladybug, the present invention has the coupling auxiliary member (30) formed at a point of the ladybug, which plays role as a medium to make combination having interconnection (including relation) between the base part (100) and the educational auxiliary member (30).

For example, as for FIG. 1, in the case that the base part (100) has a shape of a ladybug, the educational auxiliary member (10) is formed as a shape of a character of the alphabet and a shape of a digit to make an imaginary shape which pattern of a ladybug is formed as shape of a character as well as a shape of an insect attached on the coupling auxiliary member (30) formed on a point (such as in a pattern) of a ladybug's back.

Also, just like FIG. 2, in the case that the base part (100) has a shape of an apple tree, the coupling auxiliary member (30) is formed around an apple and then, the educational auxiliary member (10) having a shape of fruit, or another shape of picture, can be attached.

Namely, shape of the base part (10) pursues diversity but through extracting one or more symbolic parts (in the above example, specific parts such as fruit, point, pattern, etc.) inside the shape of the base part (10), the coupling auxiliary member (30) is formed, and then the educational auxiliary member (10) having related contents is attached in order that a shape and meaning of the base part (100) in the coupling auxiliary member (30) can make sense.

Through such relationship between the base part (100) and the educational auxiliary member (10), the infant can enjoy a chance to learn a link (interrelationship) of objects and a relation of a combination/union and furthermore, for example, by having the infant exert his imagination such as that an apple tree produces alphabet fruit, the infant can enjoy educational effects of his imagination increasing as well.

Figure 4A:
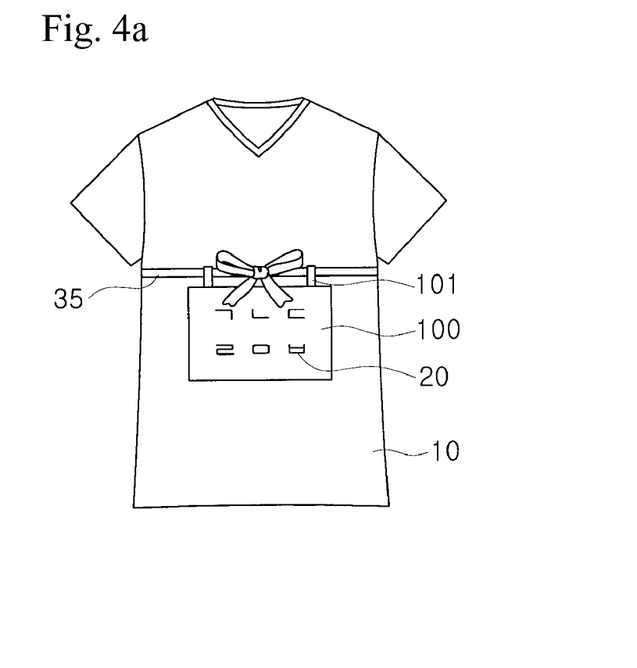
FIGS. 4a, 4b, and 4c are schematic diagrams illustrating a coupling auxiliary member of band shape.
Figure 4B:
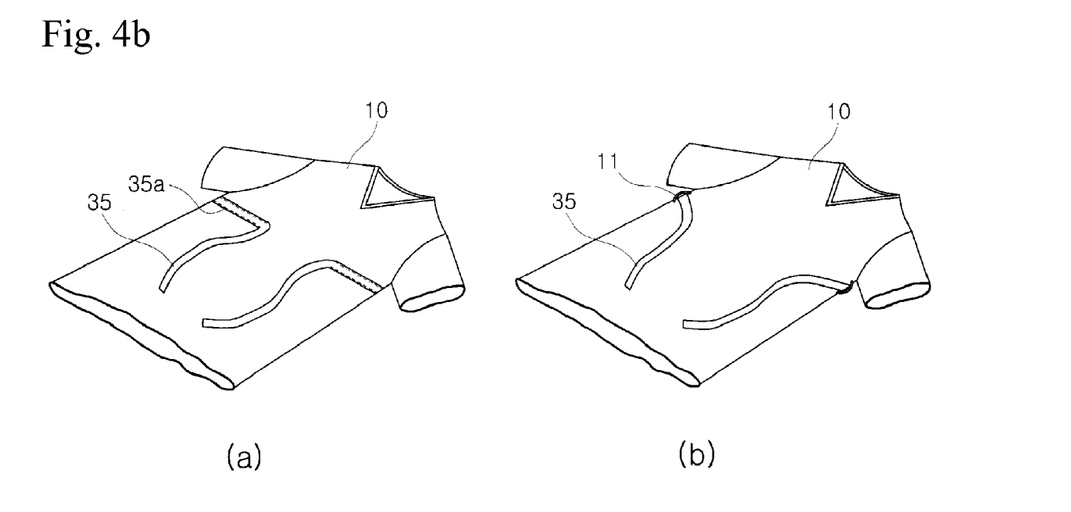
Figure 4C:
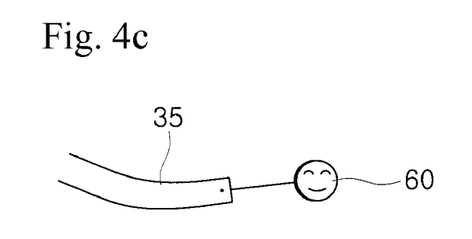

FIGS. 4a, 4b, and 4c are schematic diagrams illustrating a coupling auxiliary member of band shape.

The coupling auxiliary member according to FIG. 4a consists of an extended band (35) for wrapping around the waist of clothes (10) and in the case of using the band (35), the base part (100) has at least one ring (101) on the upper part.

That is to say, ring (101) of the base part (100) is passed onto the band (35) and then, after tying or otherwise fastening the band (35), the base part (100) can be fixed on clothes (10) through the band (35). At this time, various educational auxiliary members (20) can be installed on the base part (100).

As shown in FIG. 4*b*, besides parts connected to the base part (100), the band (35) can include a backstitch part (35*a*) fixed adhesively on the clothes through backstitch, or it can be inserted into the clothes (100) through a connecting part such as a loop (11) formed separately on the clothes (100).

The band (35) plays a role as a medium to fix the base part (100) on the clothes (10), and it can also adjust a size of the clothes as well.

Referring to FIG. 4*c*, a stopper (60) is formed on an end edge of the band (35) (connection between the band and the stopper is possible through medium such as a string). Because the stopper (60) is larger than a ring (101) formed on the base part (100), the stopper (60) can be prevented from being easily deviated and also, it has the property that it can be contracted by external force because it can comprise an elastic body in order that the stopper (60) can be inserted into the ring (101).

Figure 5:
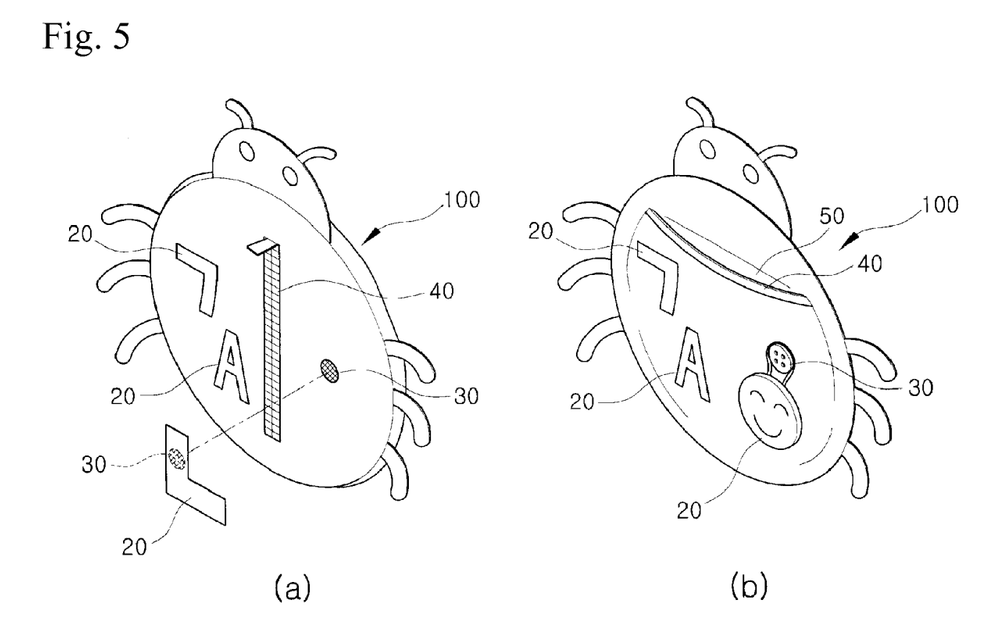
FIG. 5 is a partially magnified perspective view to show the base part having a pocket.

FIG. 5 is a partially magnified perspective view to show the base part having a pocket.

The base part (100) three-dimensionally forms a specific part or the whole parts of the whole shape. Therefore, it comes to have a fixed space (50) and also, it has a space useable as a pocket. The pocket has an opening and closing part (40) and also, it is formed to put other materials on the pocket through the opening and closing part (40).

In the concrete, in the case of FIG. 5(*a*), it is possible to enter into the space (50, not shown in FIG. 5(*a*)) through the opening and closing part (40) of zipper type, and in the case of FIG. 5(*b*), it is possible to enter into a space (50) through the opening and closing part (40) of a shape of which the forward part is opened.

That is to say, as shown in the diagram, a body part of a ladybug, which is illustratively explained, becomes a pocket and also, it is formed to provide entry into the space (50), which is inner space, through the opening and closing part (40).

Also, as shown in FIG. 5(*b*), when the coupling auxiliary member (30) is formed by using a button, by having the educational auxiliary member (10) having a ring or loop hung on the button, it is possible to express various shapes which the educational auxiliary member (10) is installed on the base part under the condition in which the educational auxiliary member (10) can be classified by a basic type or a type attached by using a ring.

Figure 6A:
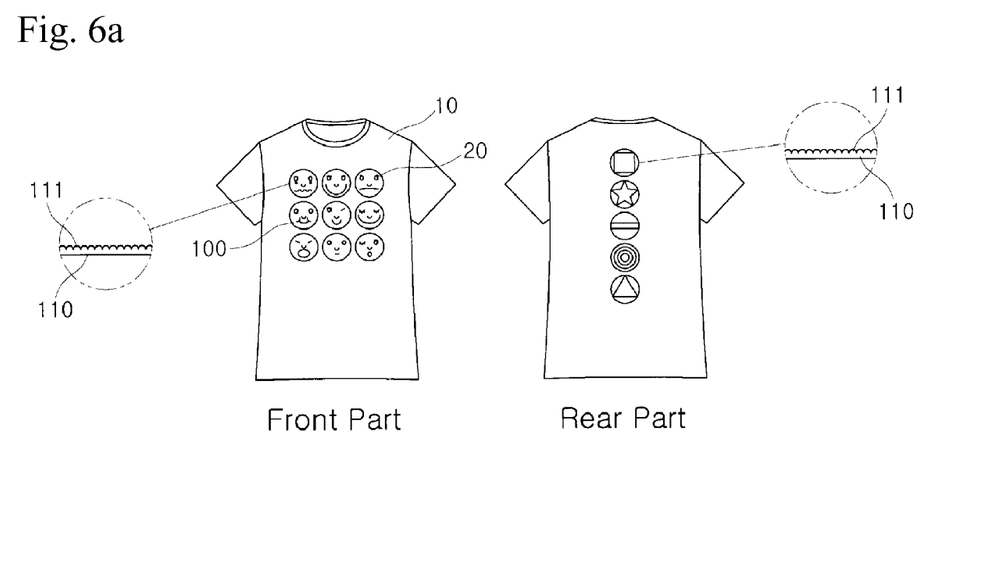
FIGS. 6a and 6b are schematic diagrams illustrating an embossing auxiliary member applied to a surface of the base part according to the present invention.
Figure 6B:
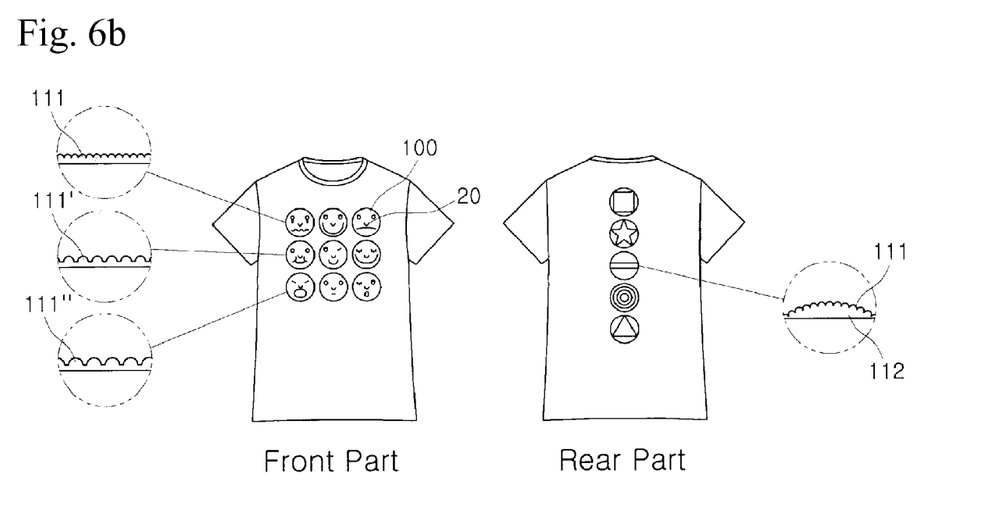

FIGS. 6*a* and 6*b* are schematic diagrams illustrating that the embossing auxiliary member is applied to a surface of the base part according to the present invention.

The base part (100) can vary in texture or roughness of surface itself, namely, the tactile feeling of a material differing from that of a surface of surrounding clothes (10).

In the concrete, a different material is used from a raw material of the clothes (10), but the material has a stronger feeling of a material than the raw material of the clothes has, namely, surroundings of the base part (rougher) or it is formed by a weak material (softer), which has the infant sense other tactile feeling of the clothes (10) through touching the base part (100) and also, stimulates a tactile sense development of the infant. Hereupon, as soft materials, micro-fiber cloth or vinyl cloth, etc. can be used and as rough materials, cloth of loose texture, cloth of synthetic resins, etc. can be used.

As for degree of roughness of an object, generally, it can be formed by the coefficient of friction of the object. Thereupon, the coefficient of friction of the base part (100) according to the present invention has a different roughness from a material of clothes, rougher or softer than an average coefficient of friction of the clothes, namely, of a surrounding part where the base part (100) is attached. Therefore, it can provide a separate tactile sensation to the infant.

To put it concretely, referring to FIG. 6*a*, under the condition that the base part (100) includes the educational auxiliary member (10), a plurality of projections (111) are formed and in the present invention, the embodiment of such a plurality of projections (111) is named as the embossing auxiliary member (110).

The above embossing auxiliary member (110) is an example to introduce roughness on the surface of the base part (100), which can help the infant with tactile sense development by giving different tactile sensations to the infant.

Also, referring to FIG. 6*b*, when a plurality of base parts (100) on the clothes (10) are formed, by separately applying a different size of each projection on the embossing auxiliary member (110) of each base part (100), namely, by forming the smallest sized projections (111), medium-sized projections (111'), and the biggest sized projections (111"), respectively, the infant can enjoy different tactile feelings accordingly as the infant touches each embossing auxiliary member (110).

In addition, the embossing auxiliary member (110) can be formed in bulging parts (112) projected upward on the whole surface similar to a convex lens. Thereupon, according to relatively increasing projected parts as well as providing new tactile feeling, it provides characteristics to further increase a probability of the infant seeking physical contact.

Because there is the base part (100) to have conceptual association with the educational auxiliary member or provide various tactile sensations, when compared with direct and simple attachment of the educational auxiliary member (20) on clothes (10) itself, it can further help the infant to learn association relationships of objects, and it can also give feeling and tactile development effect to the infant as if he would really touch related objects as well by copying practical tactile feeling of objects having a specific shape (example, a ladybug).

Figure 7A:
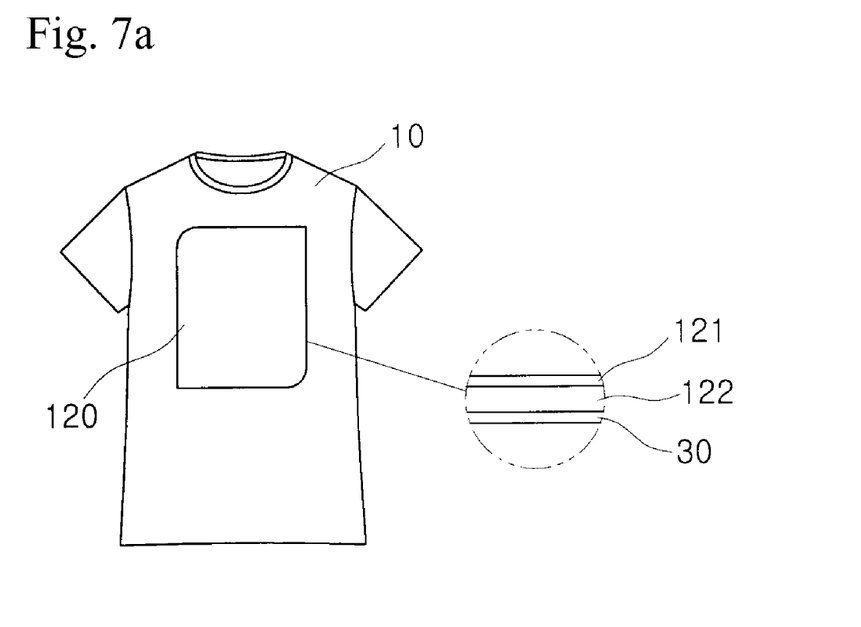
FIGS. 7a and 7b are schematic diagrams illustrating a base part according to the present invention formed by a blackboard.
Figure 7B:
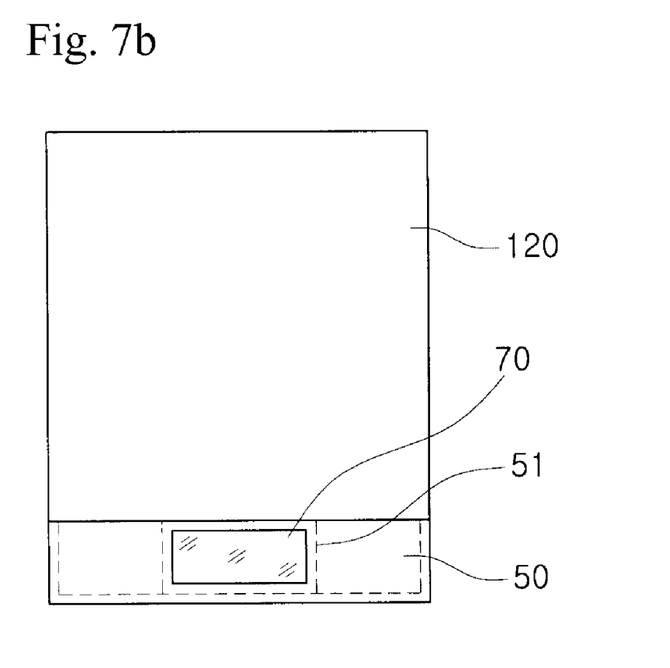

FIGS. 7*a* and 7*b* are schematic diagrams illustrating a base part according to the present invention formed by a blackboard.

As shown in FIG. 7*a*, the base part (100) according to the present invention can be realized by spreading black resin paint (121) (other colors are also available) on a main board (122) or white resin paint on a magnetism blackboard (120) (a blackboard like a white board having magnetism).

At this time, the blackboard (120) consists of a flexible material, which addresses a problem that it otherwise may not be easily attached on clothes. The blackboard (120) is formed in a proper size in order that the blackboard (120) can be easily attached on the front part of clothes, but it should not be formed in too small of a size. Thereupon, it is desirable to have the infant widely use the blackboard (120) if possible.

Also, the base part (122) consisting of the blackboard (120) can be detachably attached on clothes (10) with the coupling auxiliary member (30), for example, with the VELCRO-type hook-and-pile fastener (21*a*).

FIG. 7*b* illustrates another exemplary method where the blackboard and the space (50) and the transparent window (70), which here plays a role as a pocket, are formed around clothes positioned on the bottom of the blackboard (120).

The space (50) is designed to keep an eraser, a pen, etc., so that infant supplies of small size are prevented from being easily lost, and the space maximizes usage of the blackboard (120) through keeping other objects within it.

A plurality of spaces (50) can be prepared. That is to say, through sewing, etc., a partition (51) to divide each space (50) is formed, and then two and more spaces (50) can be formed between the partitions (50).

In addition, the transparent window (70) made of a transparent material on the front side of the space (50) can be additionally formed, and the inside of the space can be shown. Thereupon, the infant can visually distinguish, for example, a pen and an eraser inside it by naked eyes without needing to put his hand in the space (50).

Figure 8:
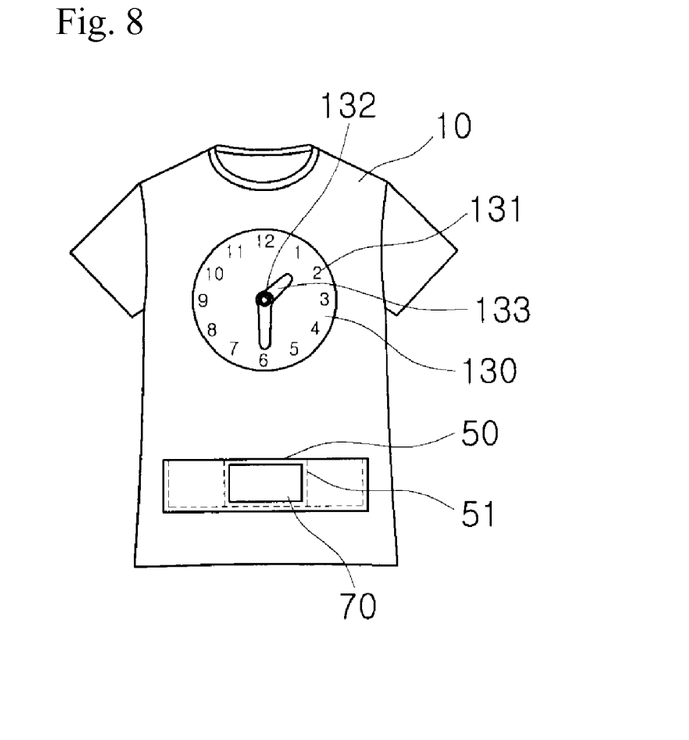
FIG. 8 is a schematic diagram illustrating a base part according to the present invention formed by a clock.

FIG. 8 is a schematic diagram illustrating a base part according to the present invention formed by a clock.

According to FIG. 8, the base part can be expressed as a clock (130) consisting of a main panel (131) on which the scale of a clock is marked, a pivot (132) fixed at the center of the main panel (131), and clock hands (133) of a pair such that 360° rotation is possible.

In addition, below the clock (130), the space (50) and the transparent window (70) can be separately formed as in the case of the above FIG. 7b, and the infant can distinguish objects inside the space (50) through the transparent window (70) by naked eyes and related or necessary objects can be kept in the space (50).

Though such a clock (130), the infant can directly and specifically rotate the clock hands (133), learn digits, and develop an idea of time.

Figure 9A:
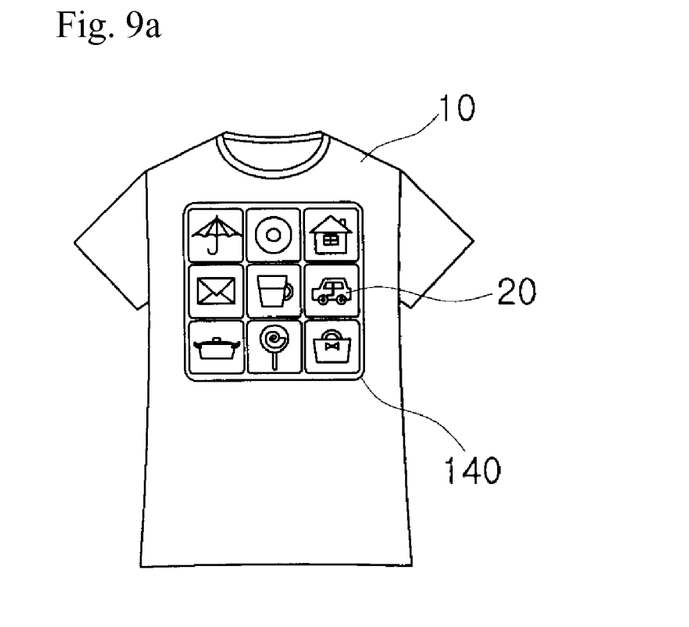
FIGS. 9a and 9b are schematic diagrams illustrating a base part according to the present invention formed by a board type which can arrange the educational auxiliary member.
Figure 9B:
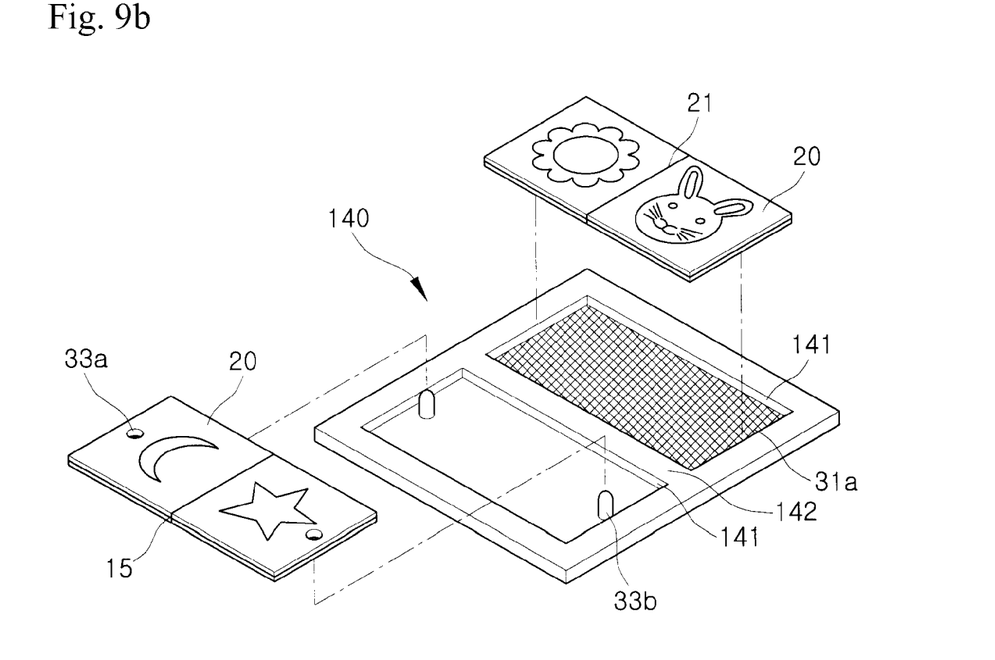

FIGS. 9a and 9b are schematic diagrams illustrating a base part according to the present invention formed by a board type which can arrange the educational auxiliary member.

As shown in FIG. 9a, because the base part formed in the board type provides a space to accommodate the educational auxiliary member (20) which is formed in a corresponding card type, by having the base part have various array structures through the partition (142), the educational auxiliary member (20) of the card type is accommodated in part for arrangement that is a concave space (141) between partitions (142).

In more detail, referring to FIG. 9b, the board (140) according to the present invention has partitions (142) formed in order that the educational auxiliary member (20) of a card type in a square (of course, other card types including a rectangular, triangle, etc are available) can have other matrix arrangements including 2×2, 3×3, etc., and the educational auxiliary member (20) is accommodated in the part for arrangement (141) formed between partitions (142).

On the bottom surface of the part for arrangement (141), the coupling auxiliary member (30) of various types (31, 32, 33, etc.) which is illustrated in FIG. 3 is formed and the educational auxiliary member (20) can be attached on it. Especially, as for the coupling auxiliary member (30), it is most desirable that the coupling auxiliary member is formed by using the VELCRO-type hook-and-pile fastener for providing easy attachment and detachment of the educational auxiliary member (20).

Also, as illustrated in FIG. 9b, the coupling auxiliary member (30) may comprise the projecting rod (33b) type and it is possible that the educational auxiliary member (20) having the coupling groove (33a) on the both sides is inserted and combined. In this case, it is also possible that the educational auxiliary member (20) be folded and tied together around a central part (15) on which watertight treatment is perembodied, such as a book.

Figure 10A:
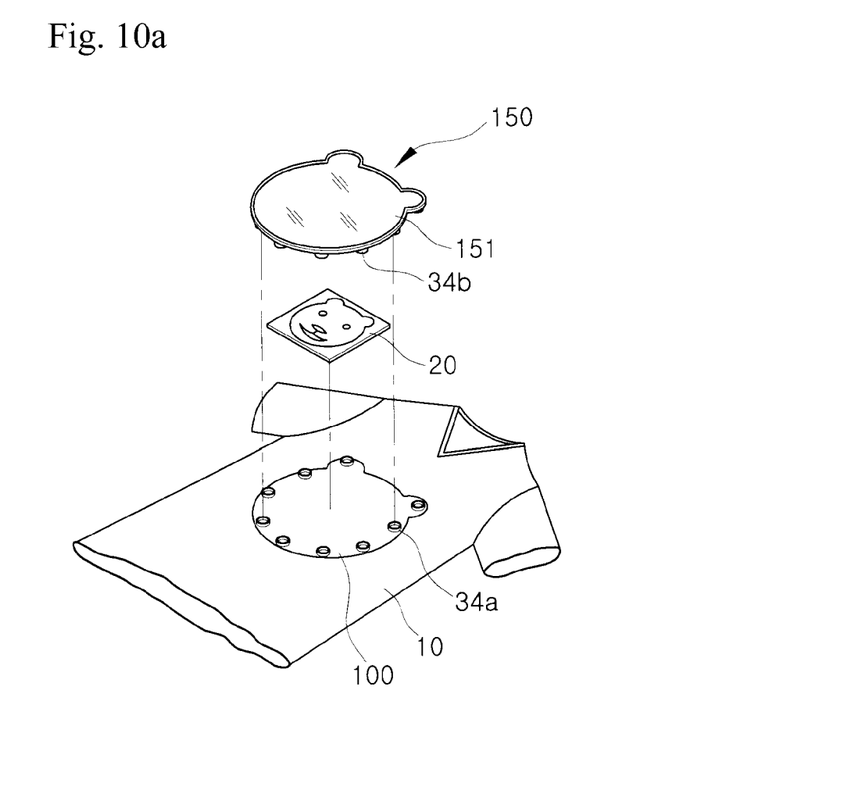
FIGS. 10a and 10b are schematic diagrams illustrating a base part according to the present invention formed with a detachable attachment/detachment cover.
Figure 10B:
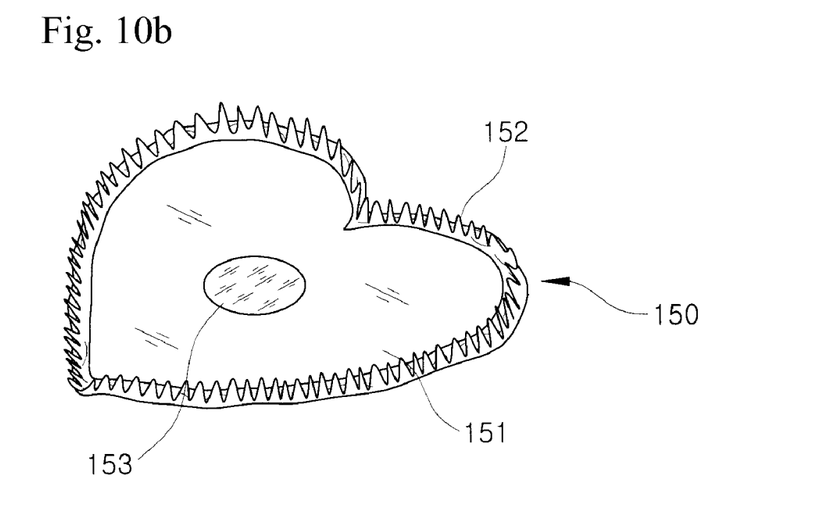

FIGS. 10a and 10b are schematic diagrams illustrating a base part according to the present invention formed with an attachment/detachment cover.

In the concrete, the attachment/detachment cover (150) adhered to clothes by using the coupling auxiliary member (34a and 34b) (in more detail, combination of a female snap and a male snap) as the medium of attachment. Hereupon, the base part (100) means a part to have the attachment/detachment cover (150) adhered. According to such a method, the educational auxiliary member (20) is basically accommodated in space on the base part (10) and also, it is possible that the educational auxiliary member (20) is formed on the base part (100) itself through printing, etc.

As shown in FIG. 10a, the attachment/detachment cover (150) and the base part (100) according to the present invention can be formed in an animal pattern, a shape of a character, and other various shapes in order to stimulate and please the infant.

The attachment/detachment cover (150) has the window (151) inside the frame making a surrounding line. The window (151) may generally be formed by using synthetic resin such as vinyl or cellophane, and it is desirable that the window (151) be formed of transparent material and that its inside can be distinguished.

Besides the above truths, the window (151) can also be formed by using cellophane paper or other durable synthetic resin materials, which are desirably formed in a translucent state. Thereupon, through expressing a synthesis effect of a color tone between the window (151) and the educational auxiliary member (20) accommodated inside it, such an embodiment usefully provides an educational effect to have the infant recognize various changes of color tone and concept according to the change of color.

For example, when the window (151) is formed in yellow cellophane and the educational auxiliary member (20) is formed in red color, by the overlapping function of yellow color and red color, an infant can learn a phenomenon that this combination of both colors produces the color orange.

It is common that the window (151) is formed in a plane, but it is possible to have the educational auxiliary member (20) be large, which may comprise the bulging part being formed in a little swollen (convex) shape considering the educational auxiliary member (20) positioned inside the window (151), easily accommodated in the attachment/detachment cover (150) and the base part (100).

The attachment/detachment cover (150) is adhered by an embodiment available for attachment and detachment through coupling such as between a male snap (34a) of the coupling auxiliary member formed on the surrounding backside and a female snap (34b) formed surrounding the base part (100). But before coupling the attachment/detachment cover (150), the educational auxiliary member (20) is formed inside it. Thereupon, the educational auxiliary member (20) is positioned between the attachment/detachment cover (150) and the base part (100) and then, the educational auxiliary member (20) can be distinguished through the window (151) of the attachment/detachment cover (150).

FIG. 10b is a schematic diagram illustrating a modified example in that a separate color formation part (153) and a tactile projection (152) are formed on the attachment/detachment cover (20).

As shown in FIG. 10b, the attachment/detachment cover (150) may comprise a heart shape, which illustrates the possibility of various changes of shape and especially, FIG. 10b illustrates that the separate color formation part (153) is formed different from surrounding color in a fixed part of the window (151).

In the concrete and for example, the separate color formation part (153) might have yellow color when part of other window (151) surrounding it is transparent or when surroundings of the window have blue color, by forming it in green color different from color around it, a function that a change of color according to mixture of color with the educational auxiliary member (20) can be easily recognized is additionally formed.

Such separate color formation part (153) need not be always formed in only one window (151) but it can be formed in plural numbers with fixed sizes or shapes.

Also, in this example, the tactile projection (152) in a fixed length is additionally formed on an outside circumference (frame) of the attachment/detachment cover (50).

Such tactile projection (152) provides a function to decorate the attachment/detachment cover (150) through an embodiment using a fabric material such as wool, and it also plays a role to develop the tactile sense of the infant when he directly touches it as well.

Figure 11A:
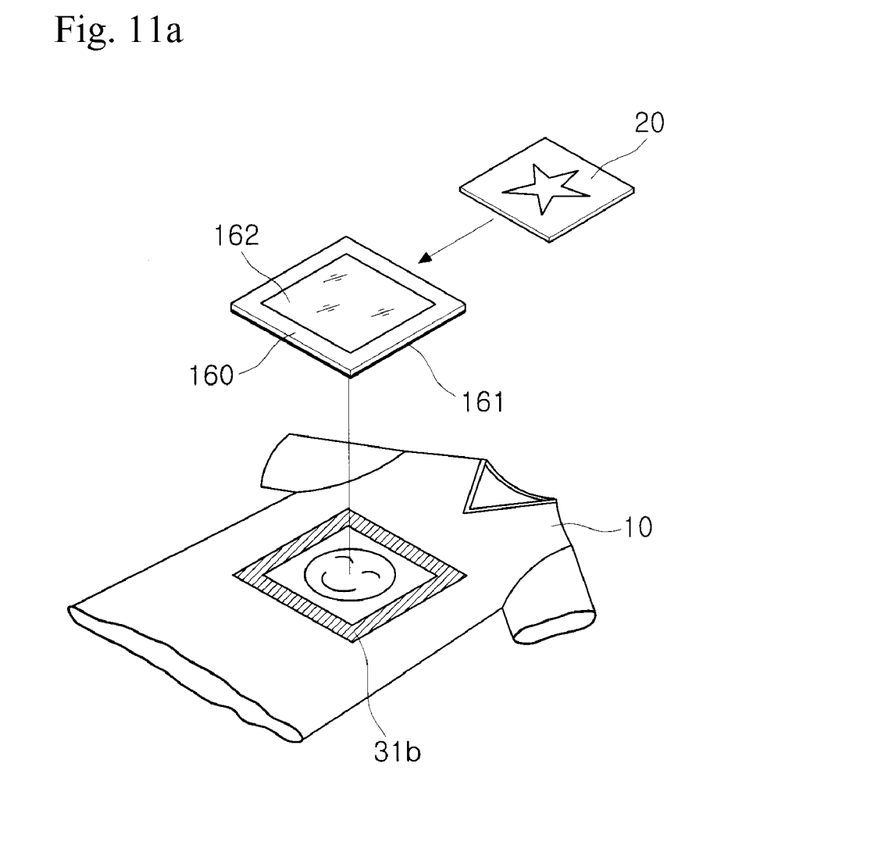
FIGS. 11a and 11b are schematic diagrams illustrating a base part according to the present invention formed by a frame type.
Figure 11B:
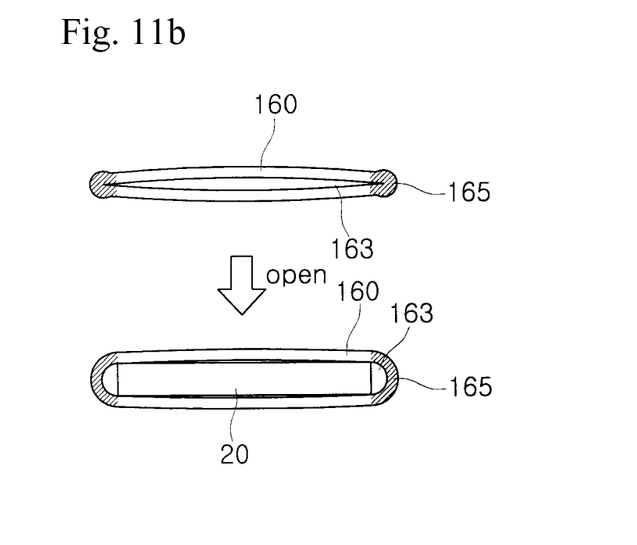

FIGS. 11a and 11b are schematic diagrams illustrating a base part according to the present invention formed by a frame type.

Referring to FIG. 11a, the base part is formed in the frame. In particular, at a part of the clothes (10) that the frame (160) adheres, and further, at a part corresponding to surrounding of the frame (160), the coupling auxiliary member, for example, the VELCRO-type hook-and-pile fastener (31b) is formed and also, on the back of the frame corresponding to the VELCRO-type hook-and-pile fastener (31b), a coupling auxiliary member is formed.

Because the frame (160) has only its surrounding, and the central part, which is the inner part of the frame (160), is formed in an opened shape, it is therefore possible for an infant to directly touch the educational auxiliary member (20) positioned inside it. But as illustrated in FIG. 11a, the transparent cover (162) is installed in the part and the educational auxiliary member (20) inside it can be protected.

Also, by forming a side part of the frame (160) in an opened structure, the educational auxiliary member (20) can be freely accommodated or pulled out through the side part of the frame (160).

FIG. 11b is a side view illustrating embodiment of a shock-absorbing auxiliary member in the base part formed in the frame according to the present invention.

As explained so far, the frame (160) according to the present invention guarantees thickness of the side part, and it can accommodate the educational auxiliary member (20) in a proper thickness. But for example, if a thickness of the educational auxiliary member (20) is thinner than a thickness of the side part of the frame (160), the placement of the educational auxiliary member (20) may be unstable instead of having a fixed condition. On the other hand, if a thickness of the educational auxiliary member (20) is thicker than a thickness of the side part of the frame (160), the educational auxiliary member (20) may not be accommodated in the frame (160). Therefore, if each thickness of each educational auxiliary member (20) is different according to each application, it can be problematic if a thickness of the side part of the frame (160) is fixed in a specific size.

To prevent such a problem, as shown in FIG. 11b, in the frame (160) according to the present invention, the shock-absorbing auxiliary member (165) is formed in smoothly curved shape on an extended part along by both frames around an opened exit (163) which is straightly extended part around the opened exit (163).

The shock-absorbing auxiliary member (165) gives resilience on the side part of the frame (160) around the opened exit (163), and it can be formed by a material of flexible gel type and a coated layer to protect it. But it is more desirable for conserving durability that it is made of Hyper-flexible polyurethane (that is to say, Hyper-gel), an outside surface of which is coated with a flexible protection layer in synthetic resin material.

Normally, such a shock-absorbing auxiliary member (165), that is to say, before accommodating the educational auxiliary member (20), is in a convex condition, which has the opened exit (163) of the frame (60) closely adhered in a flat type; then, when the educational auxiliary member (20) is accommodated, because it has a property to swell out by elasticity, according to whether the educational auxiliary member (20) is accommodated or according to thickness of the educational auxiliary member (20) in a fixed range, it has an effect that a width of the opened exit (163) is flexibly changed.

According to such characteristics, the educational auxiliary member (20) can freely change its thickness and also, it can tightly and stably adhere closely inside the frame (160).

Figure 12:
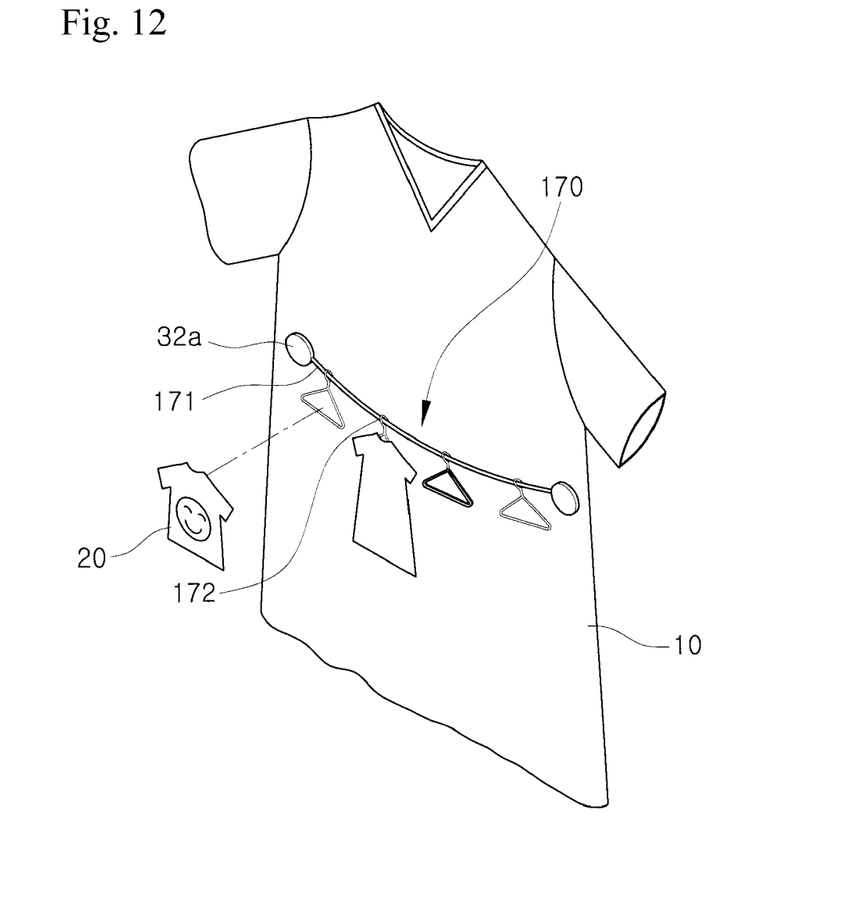
FIG. 12 is a schematic diagram to show a brief embodiment of clothes for an infant where the educational auxiliary member is installed on the base part of a washline (clothesline) shape.

FIG. 12 is a schematic diagram to show a brief embodiment of clothes for infant education where the educational auxiliary member is installed on the base part of a washline shape.

As shown in FIG. 12, the base part (100) according to the present invention can be formed in 2-dimensional plane space and tridimensionality (3D), that is to say, a washline shape but although such a washline shape can be formed in a plane, it is more desirable that the base part (100) is formed in three dimensions to increase the educational effect.

In particular, the base part (100) basically consists of strings (170), by installing buttons (32a) that is the coupling auxiliary member at both of end parts, the base part (100) can be formed by hanging clothes (10) between buttons (32a) or by hanging string (170) by using buttons, and also, one or more hangers are installed at the string (170).

The hanger (172) is fixed and adheres on the clothes (10); or, like a real hanger, by having a shape of tridimensionality (3D), the educational auxiliary member (20) in shape of clothes can be hung on it.

For example, an upper part of the hanger (172) is expressed and formed by photos hung on the string (170) and by having lower part of it have a movable 3D shape and also, by having it looked like it is solidly connected on the string as well as having the educational auxiliary member (20) in clothes shape hung on lower part of the hanger (172), an infant can be given education on a combination relation between tridimensionalities and unique interest and amusement.

In an alternative way, the hanger (172) adheres around the string (170), but by preparing the coupling auxiliary member (30) on a surface of the hanger (172), the educational auxiliary member (20) consisting of clothes can be adhered by using the coupling auxiliary member (30).

As explained so far, while embodiments and functions of clothes for infant education according to the present invention have explained by the preceding descriptions and accompanying drawings, they are merely only examples, and the spirit of the present invention is not limited on the foregoing description and drawings, and also, various changes and modifications can be made within the range of technical principles of the present invention.

What is claimed is:

1. Clothes for infant education, comprising:
   a base part detachably formed on a surface of clothes;
   an educational auxiliary member detachably attached to the base part, wherein the educational auxiliary member comprises any planar shape or a three-dimensional solid body, the educational auxiliary member including educational contents which include any of an alphanumeric character, picture, symbol, and shape, for educating an infant; and a coupling auxiliary member for providing detachable coupling between the clothes and the base part or between the base part and the educational auxiliary member, wherein the base part includes a shape or contents associated with the educational contents included in the educational auxiliary member such that a combination or association relationship between the base part and the educational auxiliary member is included in the educational contents of the clothes for infant education, the coupling auxiliary member is formed along each edge of the base part, and the base part further includes an attachment/detachment cover which can be freely adhered on the base part and includes a window having any of specific colors or transparent condition as a translucent condition, arranged so that the educational auxiliary member can be accommodated between the base part and the attachment/detachment cover and the educational auxiliary member is visible through the window when placed between the base part and the attachment/detachment cover.

2. The clothes for infant education according to claim 1, wherein the window includes a separate color formation part, which takes a fixed area, to have a different color from a remaining part.

3. The clothes for infant education according to claim 2, wherein the color formation part comprises a plurality of color formation parts of predetermined size or shape.

4. The clothes for infant education according to claim 3, wherein the plurality of color formation parts comprise mutually different colors.

5. The clothes for infant education according to claim 1, wherein the attachment/detachment cover is formed with a plurality of projected points and includes at least one tactile projection for stimulating tactile development of infants.

6. The clothes for infant education according to claim 1, wherein the attachment/detachment cover comprises a shape of a character or animal pattern.

7. The clothes for infant education according to claim 1, wherein the attachment/detachment cover comprises a convex shape including a three-dimensional volume.

8. The clothes for infant education according to claim 1, wherein the educational auxiliary member is of a different color than a color of the window, such that a third color that is a combination of the colors of the education auxiliary member and of the window is visible when the educational auxiliary member is viewed through the window.

9. Clothes for infant education, comprising:
a base part detachably formed on a surface of clothes;
an educational auxiliary member detachably attached to the base part, wherein the educational auxiliary member comprises any planar shape or a three-dimensional solid body, the educational auxiliary member including educational contents which include any of an alphanumeric character, picture, symbol, and shape, for educating an infant; and
a coupling auxiliary member for providing detachable coupling between the clothes and the base part or between the base part and the educational auxiliary member, wherein the base part includes a shape or contents associated with the educational contents included in the educational auxiliary member such that a combination or association relationship between the base part and the educational auxiliary member is included in the educational contents of the clothes for infant education, the base part comprises a frame including an opened exit, the frame being formed along a periphery of the base part, and an opened space formed inside the frame, so that the educational auxiliary member can be freely inserted in and removed from the frame through the opened exit.

10. The clothes for infant education according to claim 9, further comprising:
a shock-absorbing auxiliary member formed under a condition that a flexible protection layer is coated with Hyper-flexible polyurethane on an extended line of the frame around the opened exit of the frame, and
the educational auxiliary member comprises the frame.

11. Clothes for infant education, comprising:
a base part detachably formed on a surface of clothes;
an educational auxiliary member detachably attached to the base part, wherein the educational auxiliary member comprises any planar shape or a three-dimensional solid body, the educational auxiliary member including educational contents which include any of an alphanumeric character, picture, symbol, and shape, for educating an infant; and
a coupling auxiliary member for providing detachable coupling between the clothes and the base part or between the base part and the educational auxiliary member, wherein the base part includes a shape or contents associated with the educational contents included in the educational auxiliary member such that a combination or association relationship between the base part and the educational auxiliary member is included in the educational contents of the clothes for infant education, the educational contents which are formed on the base part and the educational auxiliary are selected so as to comprise a relationship with each other of inclusion or connection, and the base part further comprises:
a plurality of buttons positioned in some fixed distance from each other;
a string connecting the buttons and;
a hanger hung on the string,
wherein the educational auxiliary member has a clothes-like shaping so as to be connected with the hanger.

* * * * *